United States Patent
Takasu

(10) Patent No.: US 9,502,879 B2
(45) Date of Patent: Nov. 22, 2016

(54) INSULATION WATERPROOF MEMBER AND INSULATION WATERPROOFING METHOD

(71) Applicant: 3M INNOVATIVE PROPERTIES COMPANY, St. Paul, MN (US)

(72) Inventor: Kengo Takasu, Yokoham (JP)

(73) Assignee: 3M Innovative Properties Company, St. Paul, MN (US)

(*) Notice: Subject to any disclaimer, the term of this patent is extended or adjusted under 35 U.S.C. 154(b) by 96 days.

(21) Appl. No.: 14/381,455

(22) PCT Filed: Mar. 1, 2013

(86) PCT No.: PCT/US2013/028544
§ 371 (c)(1),
(2) Date: Aug. 27, 2014

(87) PCT Pub. No.: WO2013/134057
PCT Pub. Date: Sep. 12, 2013

(65) Prior Publication Data
US 2015/0096786 A1    Apr. 9, 2015

(30) Foreign Application Priority Data
Mar. 8, 2012  (JP) ................ 2012-051905

(51) Int. Cl.
*H02G 3/06*    (2006.01)
*H02G 15/08*   (2006.01)
(Continued)

(52) U.S. Cl.
CPC ............ *H02G 15/08* (2013.01); *B32B 1/00* (2013.01); *B32B 1/08* (2013.01); *B32B 7/00* (2013.01);
(Continued)

(58) Field of Classification Search
CPC .... H02G 15/04; H02G 15/18; H02G 15/003; H02G 15/08; H02G 15/1813; H02G 15/196; B32B 7/02; B32B 7/12; B32B 25/08; B32B 25/18; B32B 25/20; B32B 27/304; B32B 27/32; B32B 7/00; B32B 7/04; B32B 8/00; B32B 9/04; B32B 25/00; B32B 25/04; B32B 27/00; B32B 27/28; B32B 1/00; H01R 4/70
USPC ................ 174/76, 135, 138 F, 84 C, 84 R
See application file for complete search history.

(56) References Cited

U.S. PATENT DOCUMENTS

| 2,191,544 | A | * | 2/1940 | Ruskin | ............... | H02G 15/18 |
| | | | | | | 174/138 F |
| 2,956,109 | A | * | 10/1960 | Greco | ............... | H02G 15/18 |
| | | | | | | 174/138 F |

(Continued)

FOREIGN PATENT DOCUMENTS

| JP | S63-221507 | 9/1988 |
| JP | H01-069332 | 3/1989 |

(Continued)

OTHER PUBLICATIONS

Kikuchi (JP 11-297382 A English Translation).*
(Continued)

*Primary Examiner* — Angel R Estrada
*Assistant Examiner* — Pete Lee
(74) *Attorney, Agent, or Firm* — Gregg H. Rosenblatt

(57) ABSTRACT

An insulating waterproof member for insulating and waterproofing a connector of a cable, the insulating waterproof member including: a sealing material for covering the connector, and a protective sheet for covering the connecting portion with the sealing material interposed therebetween, the protective sheet having an adhesive layer on a surface on a sealing material side, wherein the protective sheet includes a body portion for covering the connector and an extending portion that extends in a first direction from the body portion, and the extending portion allows pressure to be imparted to the sealing material and the body portion that cover the connector in a first region at a first end side of the body portion in a second direction that intersects the first direction, in a second region at a second end side of the body portion, and in a third region between the first region and the second region.

6 Claims, 11 Drawing Sheets

(51) Int. Cl.
*B32B 7/02* (2006.01)
*H02G 15/18* (2006.01)
*H02G 15/196* (2006.01)
*H01R 4/70* (2006.01)
*B32B 7/12* (2006.01)
*B32B 25/08* (2006.01)
*B32B 25/18* (2006.01)
*B32B 25/20* (2006.01)
*B32B 27/30* (2006.01)
*B32B 27/32* (2006.01)
*B32B 7/00* (2006.01)
*B32B 7/04* (2006.01)
*B32B 9/00* (2006.01)
*B32B 9/04* (2006.01)
*B32B 25/00* (2006.01)
*B32B 25/04* (2006.01)
*B32B 27/00* (2006.01)
*B32B 27/06* (2006.01)
*B32B 27/28* (2006.01)
*B32B 1/00* (2006.01)
*B32B 1/08* (2006.01)
*H01B 19/00* (2006.01)

(52) U.S. Cl.
CPC . *B32B 7/02* (2013.01); *B32B 7/04* (2013.01); *B32B 7/12* (2013.01); *B32B 9/00* (2013.01); *B32B 9/04* (2013.01); *B32B 25/00* (2013.01); *B32B 25/04* (2013.01); *B32B 25/08* (2013.01); *B32B 25/18* (2013.01); *B32B 25/20* (2013.01); *B32B 27/00* (2013.01); *B32B 27/06* (2013.01); *B32B 27/28* (2013.01); *B32B 27/304* (2013.01); *B32B 27/32* (2013.01); *H01R 4/70* (2013.01); *H02G 15/1813* (2013.01); *H02G 15/196* (2013.01); *B32B 2307/20* (2013.01); *B32B 2307/206* (2013.01); *B32B 2307/30* (2013.01); *B32B 2307/304* (2013.01); *B32B 2307/712* (2013.01); *B32B 2307/7242* (2013.01); *B32B 2307/7246* (2013.01); *B32B 2307/7265* (2013.01); *B32B 2457/00* (2013.01); *B32B 2457/04* (2013.01); *B32B 2571/00* (2013.01); *B32B 2581/00* (2013.01); *H01B 19/00* (2013.01)

(56) References Cited

U.S. PATENT DOCUMENTS

| 3,557,298 | A | * | 1/1971 | Thompson | H02G 15/117 |
| | | | | | 150/154 |
| 4,135,904 | A | | 1/1979 | Suzuki et al. | |
| 4,869,683 | A | * | 9/1989 | Nelson | H01R 13/5213 |
| | | | | | 174/138 F |
| 5,107,077 | A | | 4/1992 | Fox | |
| 5,135,783 | A | | 8/1992 | Harvey et al. | |
| 5,147,216 | A | * | 9/1992 | Shotey | H01R 13/6392 |
| | | | | | 174/138 F |
| 7,307,219 | B1 | | 12/2007 | Dower | |
| 2007/0209821 | A1 | * | 9/2007 | Otsuki | H01R 13/5213 |
| | | | | | 174/88 R |

FOREIGN PATENT DOCUMENTS

| JP | H04-324263 | 11/1992 |
| JP | H05-131548 | 5/1993 |
| JP | H05-131549 | 5/1993 |
| JP | H06-005046 | 1/1994 |
| JP | H06-333616 | 12/1994 |
| JP | H09-180849 | 7/1997 |
| JP | H11-297382 | 10/1999 |
| JP | 2000-134784 | 5/2000 |
| JP | 2001-207316 | 8/2001 |
| JP | 2006-202571 | 8/2006 |

OTHER PUBLICATIONS

International Search Report for PCT International Application No. PCT/US2013/028544, mailed on Jul. 26, 2013, 3pgs.
Supplementary European Search Report, 3pgs, dated Jun. 11, 2015.
Russian Search Report for Application No. 2014135177, dated Feb. 24, 2016, 2pgs.

* cited by examiner

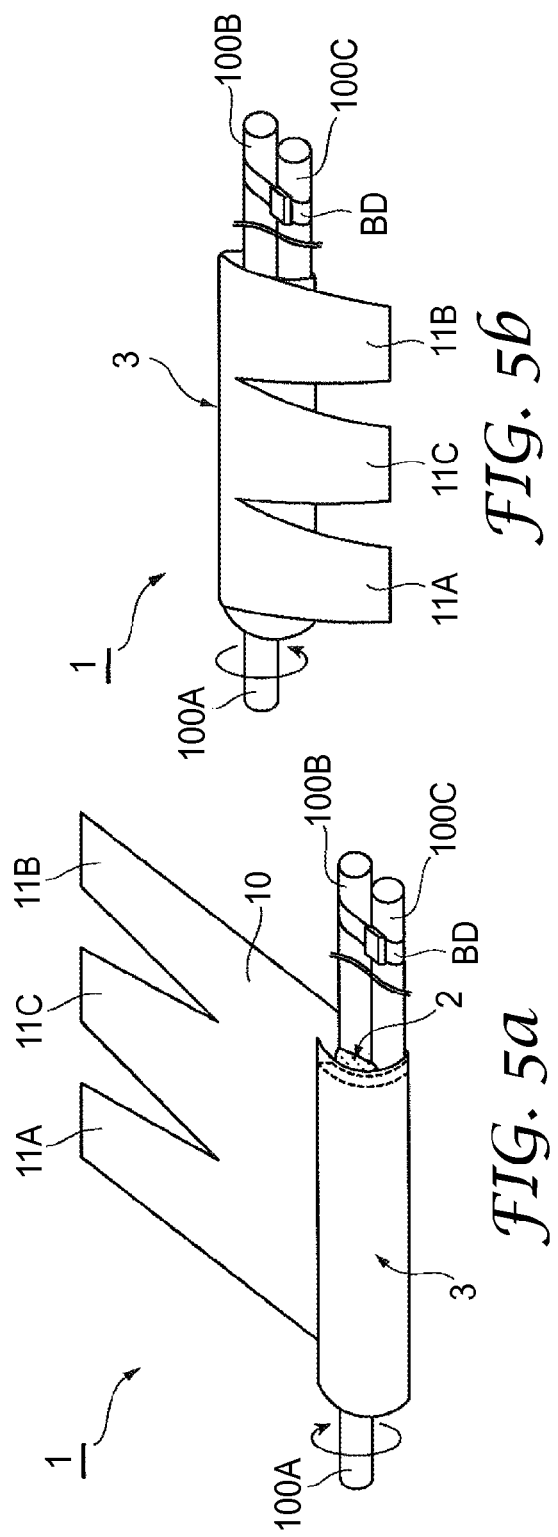
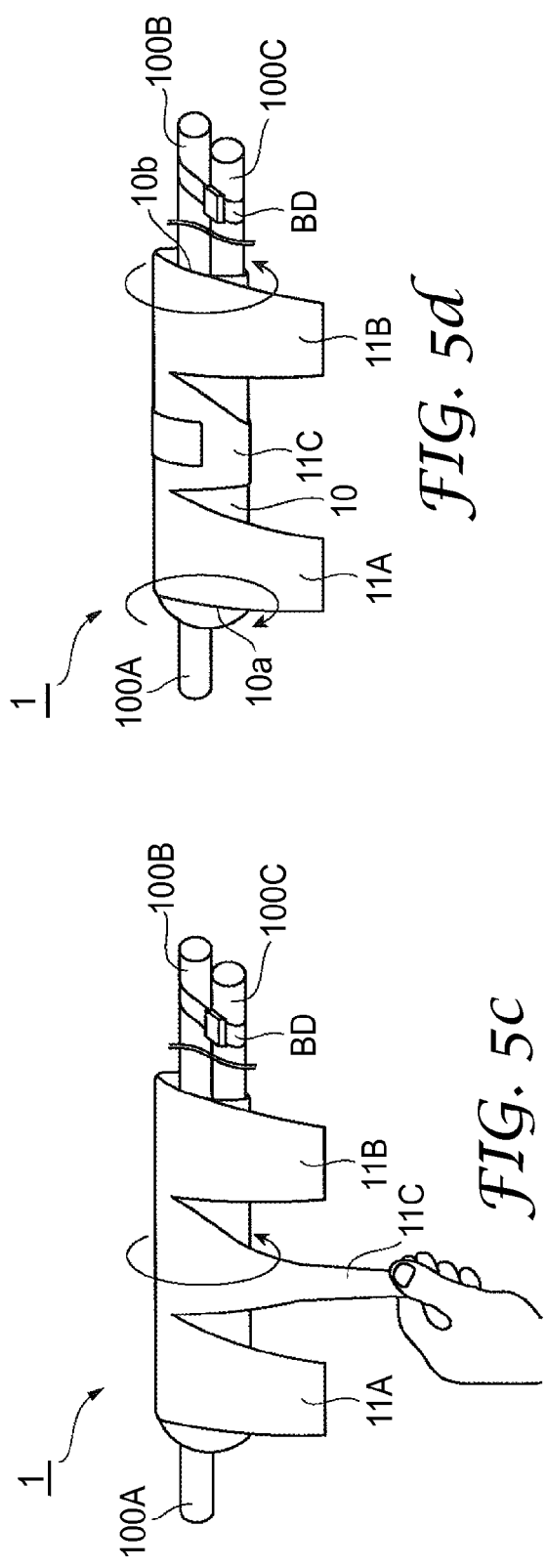

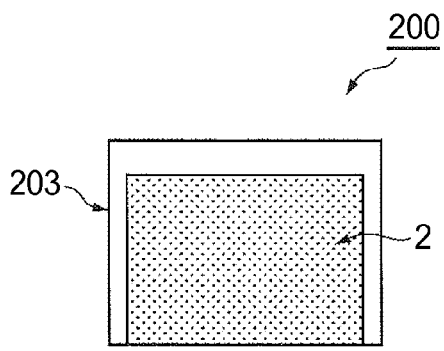
FIG. 6a(1)
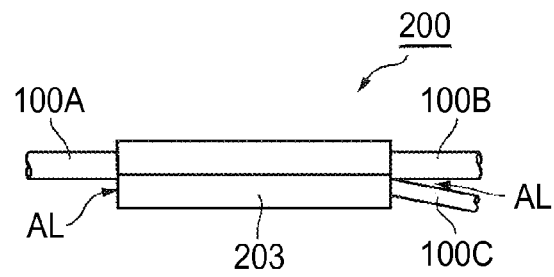
FIG. 6a(2)
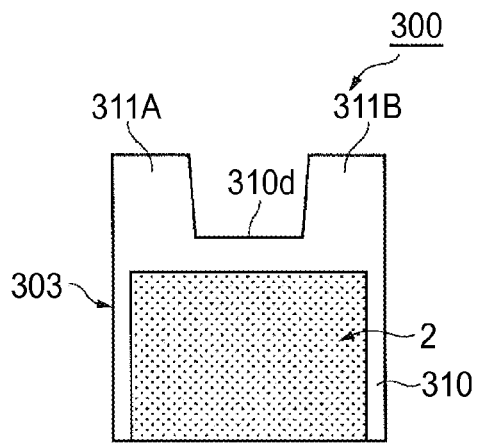
FIG. 6b(1)
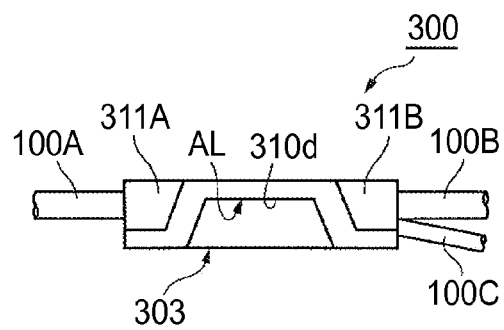
FIG. 6b(2)
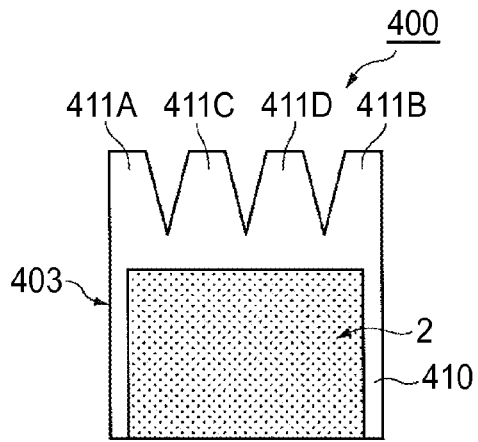
FIG. 6c(1)
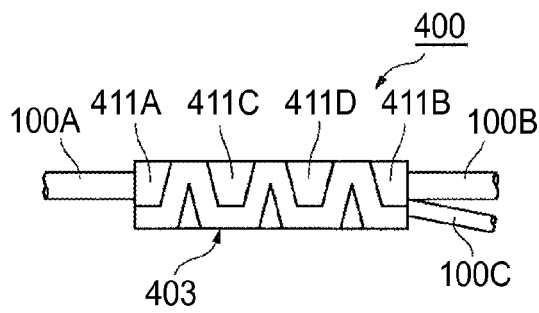
FIG. 6c(2)

INSULATION WATERPROOF MEMBER AND INSULATION WATERPROOFING METHOD

BACKGROUND

Technical Field

The present invention relates to an insulating and waterproofing member of a connector of a cable and an insulating and waterproofing method for the same.

Related Art

In Japanese Unexamined Patent Application Publication No. H4-324263 (Patent Document 1), a method is described in which a branch joint portion for electrical wire is mounted on adhesive sealing material provided on one side of a protective sheet, with a parallel wire group of a main line and branch lines arranged in a single row on that sealing material. Furthermore, in this method, both edge portions of the waterproof sheet are joined, while the waterproof sheet is bent with the inner side of the adhesive sealing material facing inwards so that the parallel wire group is forcibly deployed in a curved arrangement according to a curvature of that bend, and pressure is applied to the waterproof sheet.

In Japanese Unexamined Utility Model Application Publication No. H1-69332 (Patent Document 2), a waterproof insulating sheet is described as being formed from an insulating sheet; an adhesive insulating material positioned so as to adhere to a central region of one edge of the insulating sheet in a quantity sufficient to densely fill a gap in a wire joint portion; and an adhesive agent coated on a surface of the insulating sheet at the edge where the adhesive insulating material is adhered and at a second edge of the same surface.

BACKGROUND DOCUMENTS

Patent Documents

Patent Document 1: Japanese Unexamined Patent Application Publication No. H4-324263
Patent Document 2: Japanese Unexamined Utility Model Application Publication No. H1-69332

OVERVIEW OF THE INVENTION

Problems to be Solved by the Invention

In conventional insulating waterproof members, the connectors of the cable are simply wound with a sealing material and a protective sheet. However, in such insulating waterproof members, it may not be possible to provide the required waterproofing property to a sufficient extent.

SUMMARY

A first aspect of the present invention is an insulating waterproof member for insulating and waterproofing a connector of a cable, the insulating water proof member including: a sealing material for covering the connector, and a protective sheet for covering the connecting portion with the sealing material interposed therebetween, the protective sheet having an adhesive layer on a surface on a sealing material side, wherein the protective sheet includes a body portion for covering the connector and an extending portion that extends in a first direction from the body portion, and the extending portion allows pressure to be imparted to the sealing material and the body portion that cover the connector in a first region at a first end side of the body portion in a second direction that intersects the first direction, in a second region at a second end side of the body portion, and in a third region between the first region and the second region.

In the insulating waterproof member, the protective sheet includes an extending portion that extends in a first direction from the body portion. After the sealing material has been disposed on the connector of the cable and the connector has been covered with this sealing material and this protective sheet, the extending portion enhances the waterproofing by applying pressure to the sealing material and body portion. The extending portion allows pressure to be imparted to the sealing material and the body portion at the first region at a first end side of the body portion in the second direction, the second region at the second end side of the body portion, and the third region between the first region and the second region. Therefore, the extending portion ensures that waterproofing is provided at both end sides and in the region between the end sides. In this manner, a high degree of waterproofing can be ensured.

According to another aspect, the protective sheet may have a plurality of extending portions, and may have at least one of a first extending portion that extends from the first region of the body portion, a second extending portion that extends from the second region of the body portion, and a third extending portion that extends from the third region of the body portion. In this manner, the first extending portion reliably applies pressure to the first region, the second extending portion reliably applies pressure to the second region, and the third extending portion reliably applies pressure to the third region. Thus, because the protective sheet includes the extending portion at positions corresponding to the regions where pressure is to be applied, operability for installation personnel is improved.

According to a further aspect, a V-shape may be formed between the first extending portion and the third extending portion, and between the second extending portion and the third extending portion. Therefore, there is no break between extending portions and pressure can be applied uniformly to the sealing material and the body portion.

In a further aspect, the extending portion may have a long belt-like form. By winding the extending portion with the long belt-like form in the second direction from the first end side to the second end side, pressure can be applied to the first region, the second region, and the third region.

In a further aspect, a portion of the sealing material may be joined to the body portion of the protective sheet and another portion of the sealing material may be not joined to the body portion. In this manner, installation personnel can easily move the portions of sealing material that are not joined. Accordingly, the sealing material can easily be embedded in the area between the cables.

In a further aspect, the extending portion may apply pressure to the sealing material and the body portion by being stretched and wound onto the connector with the sealing material and the body portion interposed therebetween. In this manner, the installation personnel can ensure reliable waterproofing properties by the simple operations of stretching the extending portion and winding the stretched extending portion around the connector.

A further aspect of the present invention is an insulating and waterproofing method for insulating and waterproofing the connector using the insulating waterproof member described above. By using the insulating waterproof member, the effects described above can be obtained.

Effect of the Invention

According to the invention, a connector of a cable can be insulated and waterproofed with a high degree of waterproofing.

BRIEF DESCRIPTION OF THE DRAWINGS

FIGS. 5a-5d is a view for illustrating an insulating and waterproofing method for insulating and waterproofing the connector of a cable using the insulating waterproof member.

FIGS. 6a(1)-6c(2) is a view illustrating an insulating waterproof member according to comparative examples (FIGS. 6a(1)-6b(2)) and an insulating waterproof member according to a working example of an embodiment of the present invention (FIGS. 6c(1)-6c(2)).

DETAILED DESCRIPTION

Embodiments of the present invention will now be described with reference to the drawings. In the following embodiments, the case of a power cable rated for 600V is described as an example. However, it should be noted that sizes and shapes may be changed according to the voltage of the power cable. The insulating waterproof member according to the present invention is not limited by the size of the voltage of the power cable.

Figure 1:
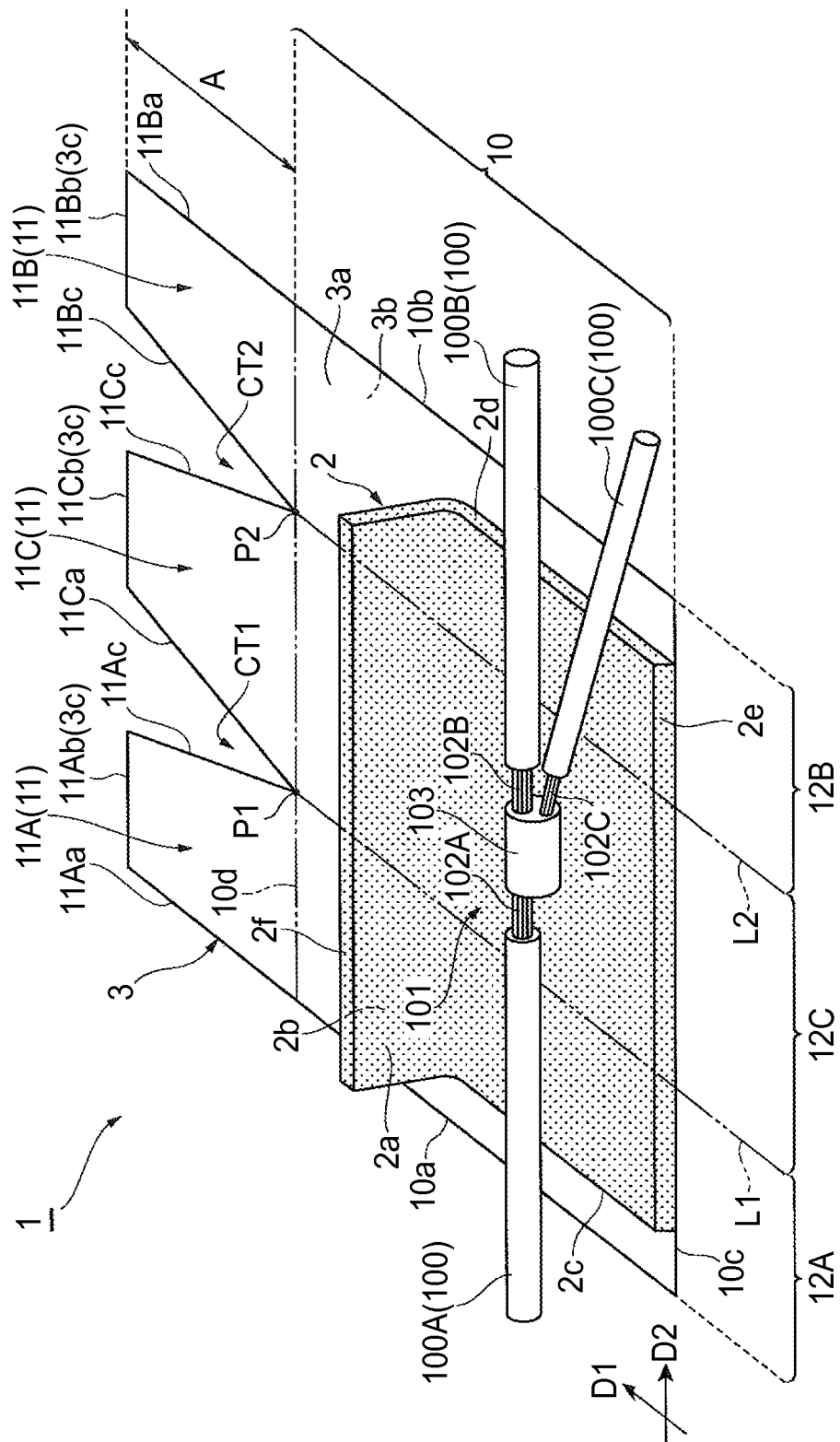
FIG. 1 is a perspective view illustrating an insulating waterproof member according to at least one embodiment of the present invention and shows a state before use.
Figure 2A:
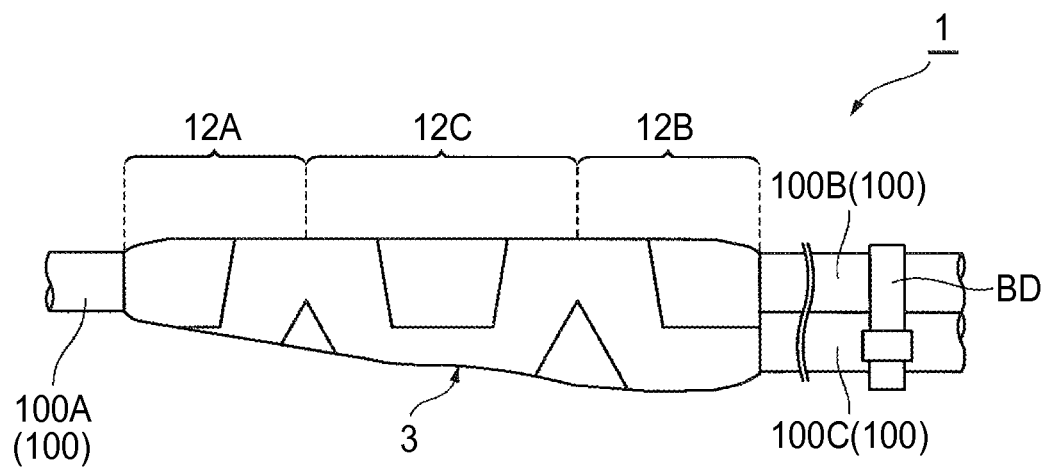
FIGS. 2a-2b illustrates the insulating waterproof member of FIG. 1 after use, with FIG. 2a illustrating the external appearance and FIG. 2b illustrating a cross-sectional view.
Figure 2B:
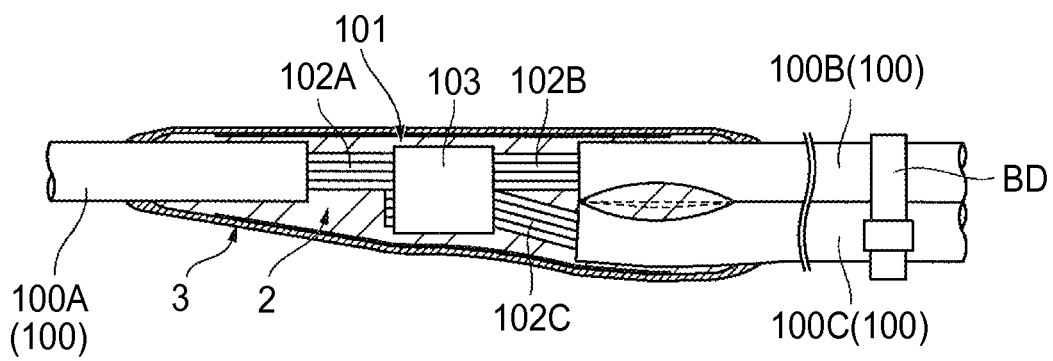

FIG. 1 is a perspective view illustrating an insulating waterproof member 1 according to a first embodiment and shows a state before use. FIGS. 2a-2b illustrates the insulating waterproof member 1 after use, with FIG. 2a illustrating the external appearance and FIG. 2b illustrating a cross-sectional view. As illustrated in FIG. 1 and FIGS. 2a-2b, the insulating waterproof member 1 insulates and waterproofs a connector 101 of a cable 100. Note that in the first embodiment, the word "cable" is used to include power lines and power cables. In the first embodiment, the case of a Y-branch connection of the cable 100 is described as an example. At the connector 101, a trunk cable 100B and a branch cable 100C are connected to a trunk cable 100A. The connector 101 is formed by connecting a stripped portion 102A of the trunk cable 100A, a stripped portion 102B of the trunk cable 100B, and a stripped portion 102C of the branch cable 100C, using a crimping fixture 103. The insulating waterproof member 1 includes a sealing material 2 for covering the connector 101 and a protective sheet 3 for covering the connector 101 with the sealing material 2 interposed therebetween (which is to say protective sheet 3 is covering the outside of the sealing material 2). The connector 101 is covered by the sealing material 2 at least at all portions of the stripped portions 102A, 102B, and 102C where the wiring is exposed and at the crimping fixture 103, and the sealing material 2 covering the connector 101 is fully covered by the protective sheet 3 (see FIGS. 2a-2b). Note that the trunk cable 100A and the trunk cable 100B may be disconnected from each other with the respective disconnected portions connected by the crimping fixture 103, together with the branch cable 100C. Further, the trunk cable 100A and the trunk cable 100B may be an uninterrupted single cable. In this case, the stripped portion is formed by removing the cover at a position part way along a single cable and connecting the branch cable 100C at the stripped portion.

The protective sheet 3 is a sheet preferably formed from a material which has excellent water resistance, insulating properties, and weather resistance. For the material of the protective sheet 3, polyethylene, PVC (poly vinyl chloride), or the like can be applied. The thickness of the protective sheet 3 can be set to 1 mm, for example, however, provided that the thickness enables stretching and allows the covered object to be protected, is not limited to any particular dimension. The protective sheet 3 includes an adhesive layer (or adhesive properties) on an inner surface 3a, which is a surface on the sealing material 2 side. On the other hand, the protective sheet 3 does not have an adhesive layer (or adhesive properties) on an exterior surface 3b, which is a surface on the opposite side to the sealing material 2. Therefore, the protective sheet 3 has an inner surface 3a having adhesiveness on the side where the connector 101 is disposed and an exterior surface 3b having no adhesiveness on an exterior side with respect to the connector 101.

The protective sheet 3 includes a body portion 10 for covering the connector 101 and an extending portion 11 that extends from the body portion 10 in a first direction D1. In the following explanation, a second direction D2 is set relative to the first direction D1 that is a direction of extension of the extending portion 11, and this direction intersects with (and in this case is perpendicular to) this first direction D1. Note that when insulating and waterproofing the connector 101, the connector 101 is arranged so that the trunk cables 100A and 100B generally extend along the second direction.

In the first embodiment, the body portion 10 is formed in a generally rectangular shape, having outer edges 10a and 10b parallel with the first direction D1 and outer edges 10c and 10d parallel with the second direction D2. A dimension between the outer edge 10a and the outer edge 10b is set at from 140 to 280 mm approximately. A dimension between the outer edge 10c and the outer edge 10d is set at from 130 to 230 mm approximately. The body portion 10 and the extending portions 11A, 11B, and 11C are preferably integrally contiguous. Therefore, the outer edge 10d, which is the border between the body portion 10 and the extending portions, is not visible and is indicated by an imaginary line in the drawings. In the body portion 10, a first region 12A that is a region at a first end side in the second direction (the outer edge 10a side in the first embodiment), a second region 12B that is a region at a second end side in the second direction (the outer edge 10b side in the first embodiment), and a third region 12C that is a region between the first region 12A and the second region 12B are defined. In the example illustrated in FIG. 1, imaginary lines L1 and L2, which are parallel to the first direction, serve to divide the body portion 10 into three regions along the second direction. The first region 12A is formed between the outer edge 10a and the imaginary line L1, the third region 12C is formed between the imaginary line L1 and the imaginary line L2, and the second region 12B is formed between the imaginary line L2 and the outer edge 10b.

The extending portion 11 is configured to allow pressure to be applied to the body portion 10 and the sealing material 2 covered by this body portion 10 in at least the first region 12A, the second region 12B and the third region 12C. Specifically, the protective sheet 3 includes a first extending portion 11A that extends in the first direction from the first region 12A of the body portion 10, a second extending portion 11B that extends in the first direction from the second region 12B of the body portion 10, and a third extending portion 11C that extends in the first direction from the third region 12C of the body portion 10. The extending portions 11A, 11B, and 11C impart pressure on the sealing material 2 and the body portion 10 by being stretched and wound on the connector 101 with the sealing material 2 and the body portion 10 interposed therebetween.

The extending portions 11A, 11B, and 11C are formed with two V-form cutout portions CT1 and CT2 in one outer edge 3c of the rectangular protective sheet 3. Note that the region where the cutout portions CT1 and CT2 are not formed is the body portion 10. The first extending portion 11A is contiguous at a location corresponding to the first region 12A at an outer edge 10d of the body portion 10, and has an outer edge 11Aa that is parallel with the first direction, a tip edge 11Ab parallel to the second direction, and an inclined edge 11Ac formed by the cutout portion CT1. The second extending portion 11B is contiguous at a location corresponding to the second region 12B at an outer edge 10d of the body portion 10, and has an outer edge 11Ba that is parallel with the first direction, a tip edge 11Bb parallel to the second direction, and an inclined edge 11Bc formed by the cutout portion CT2. The third extending portion 11C is contiguous at a location corresponding to the third region 12C at an outer edge 10d of the body portion 10, and has a tip edge 11Cb parallel to the second direction, an inclined edge 11Ca formed by the cutout portion CT1, and an inclined edge 11Cc formed by the cutout portion CT2.

The outer edge 11Aa of the first extending portion 11A forms a straight line that continues along the outer edge 10a of the body portion 10. The outer edge 11Ba of the second extending portion 11B forms a straight line that continues along the outer edge 10b of the body portion 10. The tip edges 11Ab, 11Bb, and 11Cb correspond to the outer edge 3c of the protective sheet 3 before the cutout portions CT1 and CT2 are introduced, and are each formed on the same straight line. A dimension A between the tip edges 11Ab, 11Bb, and 11Cb and the outer edge 10d, which is to say an extension amount of the extending portions 11A, 11B, and 11C, is preferably large enough to allow at least one full winding (in the operation of FIG. 5C). One V-form is formed between the first extending portion 11A and the third extending portion 11C, specifically between the inclined edge 11Ac and the inclined edge 11Ca. The angle of the V-form shape is preferably an acute angle. Further, a tip point P1 of the V-form shape is arranged on the intersection between the outer edge 10d of the body portion 10 and the imaginary line L1. Another V-form is formed between the second extending portion 11B and the third extending portion 11C, specifically between the inclined edge 11Bc and the inclined edge 11Cc. The angle of the V-form is preferably an acute angle. Further, a tip point P2 of the V-shaped form is arranged on the intersection between the outer edge 10d of the body portion 10 and the imaginary line L2.

Note that while in the first embodiment, the regions 12A, 12B, and 12C have been clearly defined using the imaginary lines L1 and L2 for the purposes of explanation, the manner in which the regions are defined may be freely selected. Specifically, provided that a positional relationship is satisfied whereby the first region 12A is a region at the first end side of the body portion 10 in the second direction, the second region 12B is a region at the second end side of the body portion 10 in the second direction, and the third region 12C is a region between the regions 12A and 12B, the regions 12A, 12B, and 12C may be defined in any way desired.

The sealing material 2 is a sheet formed from a material with excellent water resistance, electrical insulating properties, and weather resistance. For example, for the sealing material 2, an insulating putty containing butyl rubber, silicon rubber, Ethylene-Propylene-Diene Methylene (EPDM), nitrile butadiene rubber (NBR), or the like can be used. An appropriate thickness of sealing material 2 depends on various factors depending on the conditions of its use. A thickness of the sealing material 2 may, for example, be not less than 3 mm and not more than 4 mm, not less than 5 mm and not more than 8 mm, or not less than 10 mm and not more than 12 mm.

The sealing material 2 is generally rectangular, having mutually parallel outer edges 2c and 2d, and mutually parallel outer edges 2e and 2f that are perpendicular to the outer edges 2c and 2d. The sealing material 2 is arranged so that the outer edges 2c and 2d are parallel to the first direction D1 and the outer edges 2e and 2f are parallel to the second direction D2. The sealing material 2 may be laminated to the inner surface 3a of the body portion 10 of the protective sheet 3 so that the exterior surface 2b of the sealing material 2 is joined to the inner surface 3a of the body portion 10. A dimension between the outer edge 2c and the outer edge 2d is smaller than a dimension between the outer edge 10a and the outer edge 10b of the body portion 10, and in at least some embodiments is set at from 120 to 220 mm approximately. A dimension between the outer edge 2e and the outer edge 2f is smaller than a dimension between the outer edge 10c and the outer edge 10d of the body portion 10, and is set at from 120 to 260 mm approximately. In the first embodiment, the outer edge 2c is disposed inwards in a planar direction of the outer edge 10a of the body portion 10, and the outer edge 2d is disposed inwards in a planar direction of the outer edge 10b of the body portion 10. Note that it is preferable to ensure that there is sufficient clearance between the outer edge 2c and the outer edge 10a so that the sealing material 2 does not protrude beyond the protective sheet 3 even when the sealing material 2 is fastened by stretching and winding the extending portions 11A, 11B, and 11C. The outer edge 2f is arranged inward of the outer edge 10d of the body portion 10 in the planar direction, and the outer edge 2e is arranged so as to generally match the outer edge 10c of the body portion 10 (the two may be fully matched or the outer edge 2e may be disposed slightly inward of the outer edge 10c). A portion of the sealing material 2 is joined to the body portion 10 of the protective sheet 3 and another portion of the sealing material 2 is not joined to the body portion 10. In the first embodiment, a region making up approximately half of the outer edge 2e side is joined to the body portion 10. Meanwhile, a region making up approximately half of the outer edge 2f side is not joined to the inner surface 3a of the body portion 10. In the distribution process of the insulating waterproof member 1, a non-contact state between the sealing material 2 and the protective sheet 3 is maintained in this region by inserting a release paper P (FIG. 3B) between the protective sheet 3 and the sealing material 2. In the distribution process, the inner surface 3a of the protective sheet 3 and the inner surface 2a of the sealing material 2, which are both surfaces having adhesiveness, are covered by release paper.

Next, an insulating and waterproofing method for insulating and waterproofing the connector 101 of the cable 100 using the insulating waterproof member 1 described above is described with reference to FIGS. 3a to 5d. In the following, a case in which the cable is an electrical cable with a 600V rating is described. However, it should be noted that the sizes will need to be changed appropriately when the invention is applied to a cable with a different voltage rating.

Figure 3A:
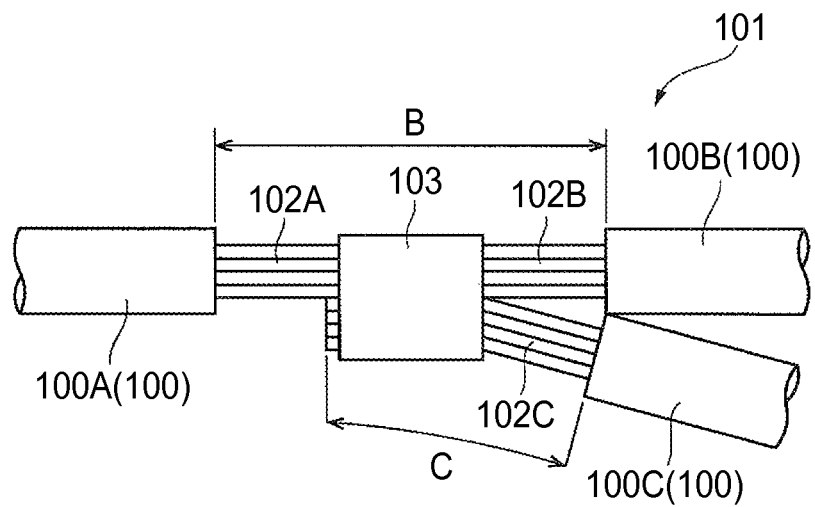
FIGS. 3a-3b is a view for illustrating an insulating and waterproofing method for insulating and waterproofing a connector of a cable using the insulating waterproof member.
Figure 3B:
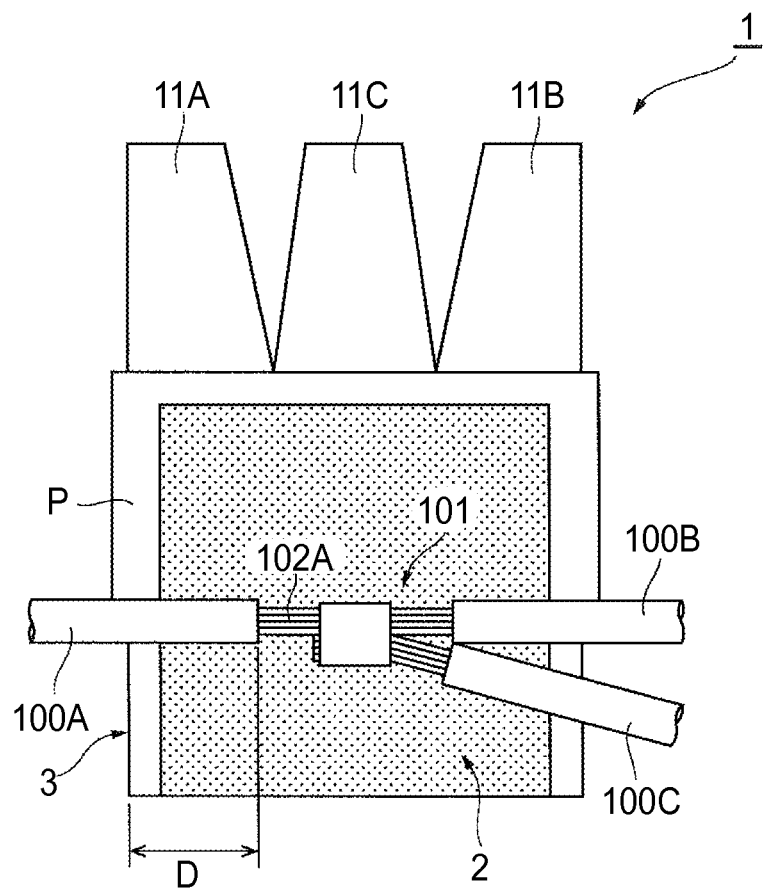

First, as illustrated in FIG. 3a, the sheath and insulator is peeled back from each of the cables 100A, 100B, and 100C. Here, a dimension of B illustrated in FIG. 3a is set at approximately from 60 to 110 mm, and the dimension of C illustrated in FIG. 3a is set at approximately from 45 to 85 mm. The stripped portion 102A of the trunk cable 100A, the stripped portion 102B of the trunk cable 100B, and the stripped portion 102C of the branch cable 100C are connected with the crimping fixture 103 using a predetermined tool. The connector 101 is formed as described above. Next, as illustrated in FIG. 3b, the connector 101 is arranged in a generally central position of the sealing material 2. Here, the connector 101 is arranged so that end faces at the release paper P side of the trunk cables 100A and 100B (end portion at the top side of the paper in FIG. 3b) and an end portion at the connector 101 side of the release paper P (end portion at the bottom side of the paper in FIG. 3b) meet. Here, a dimension of D illustrated in FIG. 3b is set at approximately from 30 mm to 50 mm.

Figure 4A:
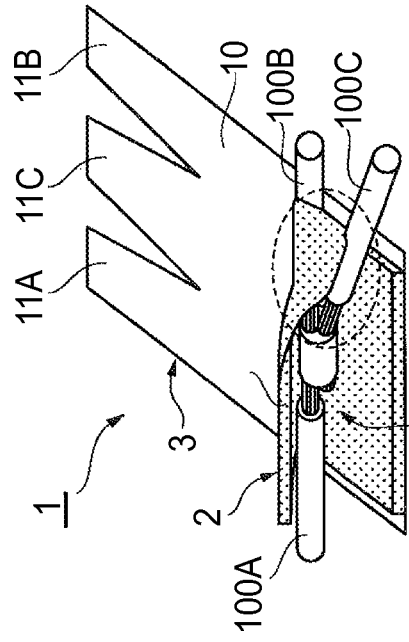
FIGS. 4a-4d is a view for illustrating an insulating and waterproofing method for insulating and waterproofing the connector of a cable using the insulating waterproof member.
Figure 4B:
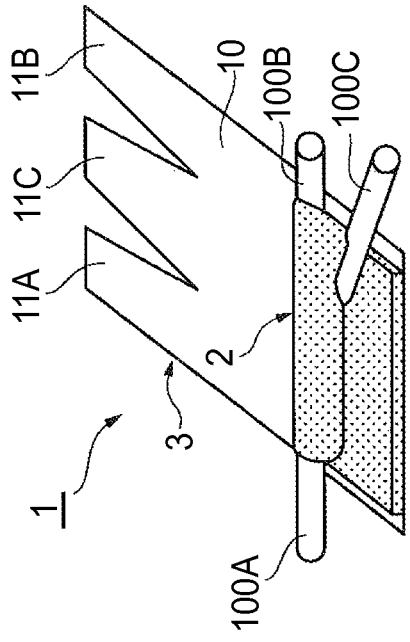
Figure 4D:
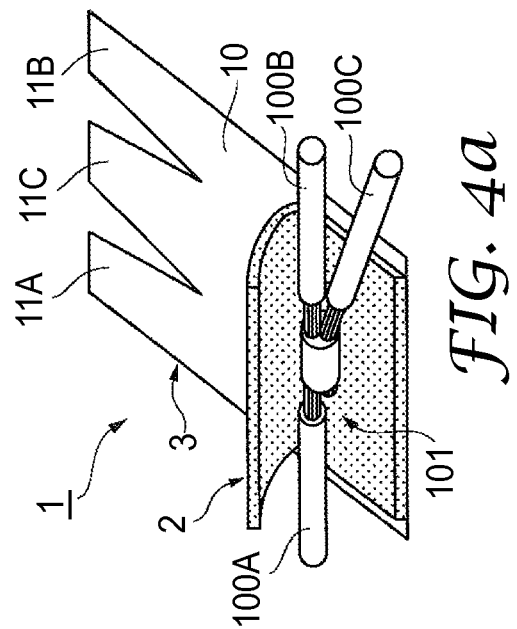
Figure 4C:
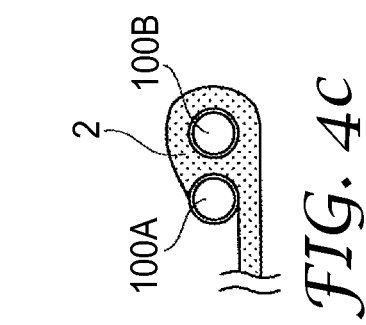

Next, as illustrated in FIG. 4a, the sealing material 2 on the release paper P is lifted and the release paper P is removed. As illustrated in FIG. 4b, a gap is opened between the trunk cable 100B and the branch cable 100C and the outer edge 2f of the sealing material 2 is inserted into this gap. As illustrated in FIG. 4c, the sealing material 2 is packed sufficiently between the trunk cable 100B and the branch cable 100C. As illustrated in FIG. 4d, the remaining portion of the sealing material 2 is wound onto the cables 100A, 100B, and 100C, and the cable connector 101 without a gap.

Next, as illustrated in FIG. 5a, cable ties BD for tying the trunk cable 100B and the branch cable 100C are attached. Further, the protective sheet 3 on the side where the sealing material 2 is joined (side opposite the extending portions 11A, 11B, and 11C) is wound onto the cables 100A, 100B, and 100C. Here, the sealing material 2 already wound onto the cables and the like, and the sealing material 2 to be newly wound are connected without a gap. Next, as illustrated in FIG. 5b, portions of the protective sheet 3 on the extending portions 11A, 11B, and 11C side are wound onto the cables and the like. As illustrated in FIG. 5c, the tip portion of the third extending portion 11C positioned at a central portion is attached while being stretched sufficiently and wound in the stretched state. With this arrangement, pressure is applied to the body portion 10 and the sealing material 2 in the third region 12C in the central position area. Next, as illustrated in FIG. 5d, the tip portion of the first extending portion 11A positioned at the first end side in the second direction D2 is stretched sufficiently and wound in the stretched state (as illustrated in FIG. 5c). With this arrangement, pressure is applied to the body portion 10 and the sealing material 2 in the first region 12A and waterproofing is ensured in that portion. Here, it is preferable that the first extending portion 11A is wound so as to hide the sealing material 2 along the outer edge 10a of the body portion 10. Further, the tip portion of the second extending portion 11B positioned at the second end side in the second direction D2 is stretched sufficiently and wound in the stretched state (as illustrated in FIG. 5c). With this arrangement, pressure is applied to the body portion 10 and the sealing material 2 in the second region 12B and waterproofing is ensured in that region. Here, it is preferable that the second extending portion 11B is wound so as to hide the sealing material 2 along the outer edge 10b of the body portion 10. With the above process, a state is formed as illustrated in FIG. 2a, and the insulation and waterproofing of the connector 101 is completed.

Next, the action and effect of the insulating waterproof member 1 according to the present invention will be described.

For example, when a protective sheet 203 that is simply rectangular is wound on the connector 101 together with the sealing material 2 as in the insulating waterproof member 200 according to the comparative example illustrated in FIGS. 6a(1) and 6a(2), the pressure of the sealing material 2 on the connector 101 is insufficient and sufficient waterproofing may not be ensured. Meanwhile, in the insulating waterproof member 1 according to the first embodiment, the protective sheet 3 includes the extending portions 11A, 11B, and 11C extending in the first direction D1 from the body portion 10. The connector 101 is arranged on the sealing material 2 so that the cable 100 extends along the second direction D2. After covering the connector 101 with the sealing material 2 and the body portion 10 of the protective sheet 3, the extending portions 11A, 11B, and 11C apply pressure to the sealing material 2 and the body portion 10. With this arrangement, because the sealing material 2 is pressed against the connector 101 sufficiently, waterproofing can be enhanced.

Figure 10A:
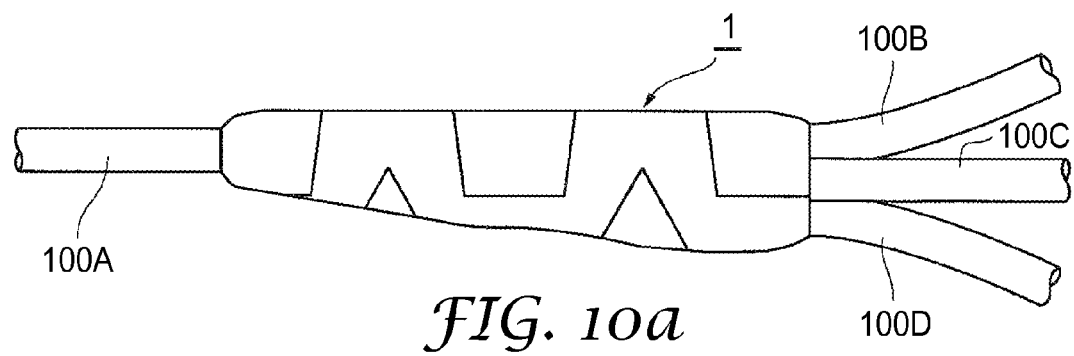
FIGS. 10a-10b is a view illustrating a way of insulating and waterproofing a connector according to an embodiment of the present invention differing from the connector illustrated in FIG. 1.
Figure 10B:
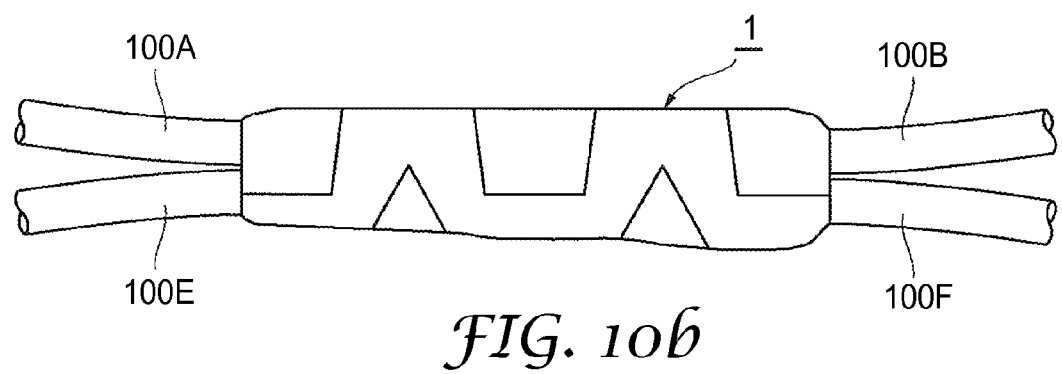
Figure 11A:
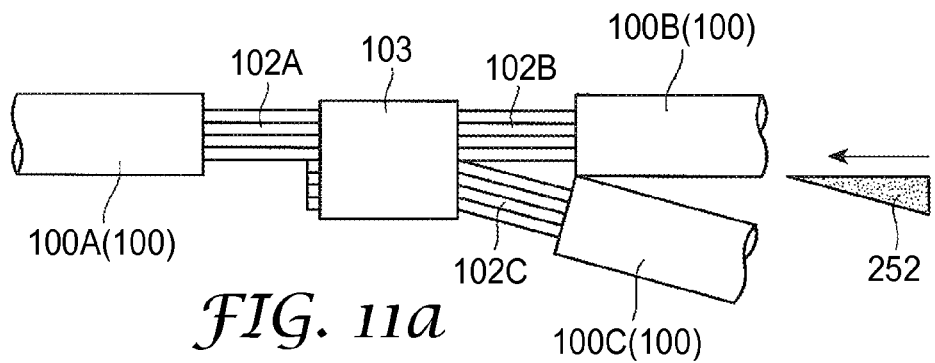
FIGS. 11a-11c is a view illustrating an insulating waterproof member according to a comparative example.
Figure 11B:
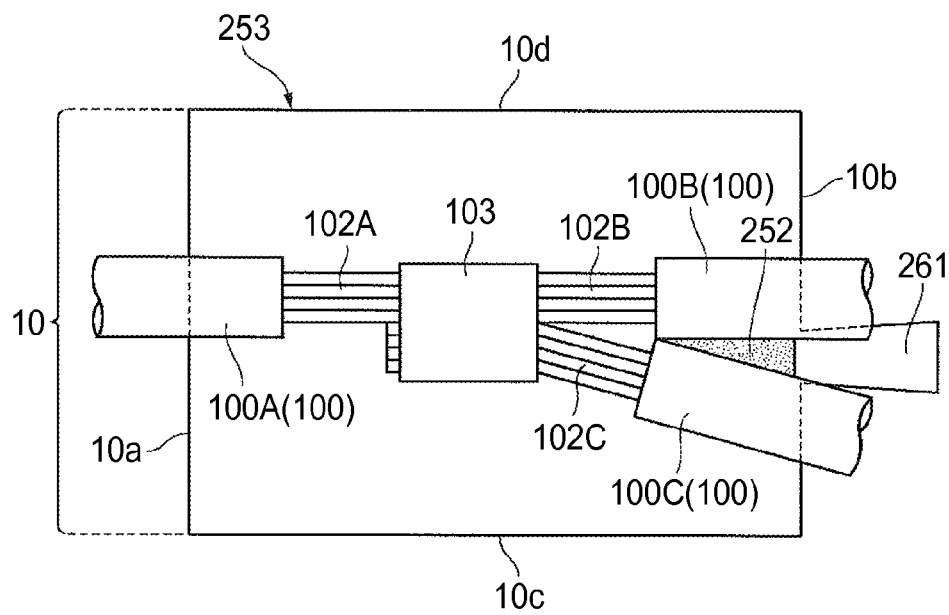
Figure 11C:
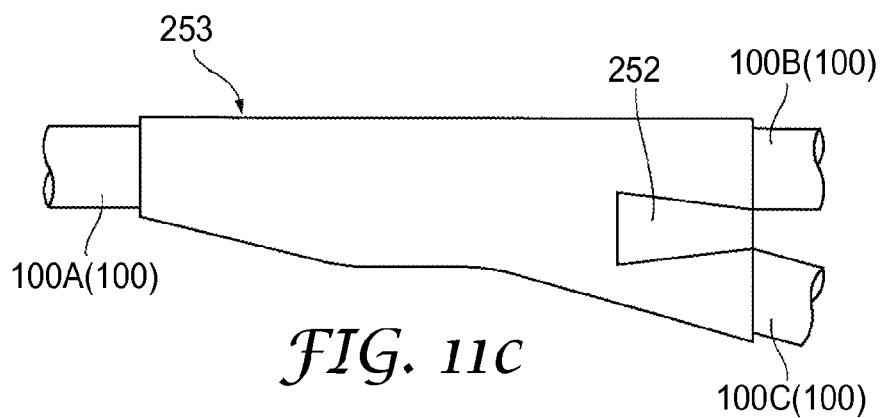

Moreover, because the extending portions 11A, 11B, and 11C extend from the body portion 10 in the first direction (direction that intersects with the direction of extension of the cable 100), pressure can be applied to the body portion 10 and the sealing material 2 by winding the extending portions 11A, 11B, and 11C onto the connector 101. As a result, the insulating waterproof member 1 is not limited by the form of the connector 101, and can be applied to a connector 101 of any given form. For example, as illustrated in a comparative example in FIGS. 11a-11c, a protective sheet 253 has an extending portion 261 extending in the second direction D2 from the outer edge 10b of the body portion 10 (note that an insulating sheet or the like is disposed to cover parts of the stripped portion 102 and the crimping fixture 103 but these have been omitted from FIG. 11). In the protective sheet 253 according to the comparative example, a sealing material 252 is partially packed into a Y-branch portion between the trunk cable 100B and the branch cable 100C (see FIG. 11a and FIG. 11b), and the Y-branch portion is covered by the extending portion 261 of the outer edge 10b of the body portion 10 (see FIG. 11c). A protective sheet of this type can only be applied to Y-branch connectors, and cannot be used with connectors of other forms (such as the form illustrated in FIGS. 10a-10b). Further, because the sealing material 252 for partially packing into the branch portion is required, the number of parts increases. On the other hand, with the insulating waterproof member 1 according to the first embodiment, the extending portions 11A, 11B, and 11C are wound onto the connector 101 from the side, and therefore, the sealing material can impart sufficient pressure on the connector 101 regardless of the form of the connector 101. Therefore, as illustrated in FIG. 10a, the insulating waterproof member 1 can be applied to a connector where a single cable 100 branches into three cables 100B, 100C, and 100D. Moreover, as illustrated in FIG. 10b, the insulating waterproof member 1 can be applied to a connector in which two cables 100A and 100E connect to two cables 100B and 100F. Even without using the sealing material for partially packing into the branch portion, the insulating waterproof member 1 can be applied to connectors of various forms using only the single rectangular sealing material 2.

When extending portions 311A and 311B are formed at both end sides in the second direction D2 but no extending portion is formed in a region therebetween so that a straight outer edge 310d is formed, as in the protective sheet 303 of an insulating waterproof member 300 according to the comparative example as illustrated in FIGS. 6b(1) and 6b(2), it is not possible to impart sufficient pressure on the sealing material 2 and a body portion 310 in proximity to the central position. Therefore, it may not be possible to obtain sufficient waterproofing in this portion. In the first embodiment of the invention, on the other hand, the extending portions 11A, 11B, and 11C allow pressure to be imparted on the sealing material 2 and the body portion 10 at the first region 12A that is a region at a first end side in the second direction, the second region 12B that is a region at the second end side in the second direction, and the third region 12C that is a region between the first region 12A and the second region 12B. Therefore, the extending portions 11A, 11B, and 11C ensure that waterproofing is provided at both end sides and in the region between the end sides. In this manner, a high degree of waterproofing can be ensured.

The insulating waterproof member 1 may have properties that satisfy the following standards, for example. The following items are according to K1101 "connector properties standard for 600V cross-linked polyethylene insulated power cable" for straight cable connectors, as stipulated by the Japan Power Cable Accessories Association (JCAA).

Commercial-use withstanding voltage: Withstand 3.5 kV for 10 minutes (or 1.0 kV for 10 minutes after the cable has risen to operating temperature).

Operating temperature rise: 3 cycles of 105° C. for 3 hours, with no faults.

Seal (external pressure): Must not allow water to penetrate to the inner portion when placed under 98 kPa for one hour.

Figure 9A:
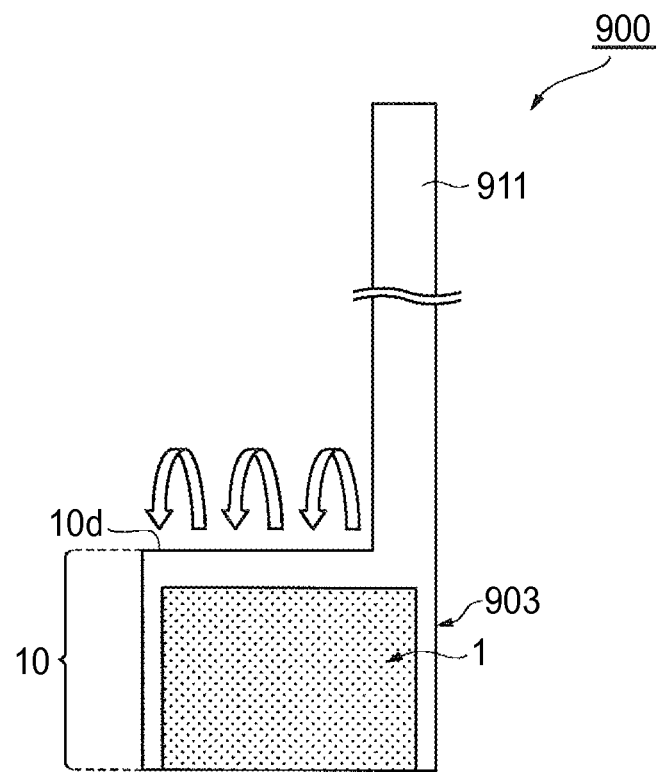
FIGS. 9a-9b is a view illustrating insulating waterproof members according to modified examples of embodiment of the present invention.
Figure 9B:
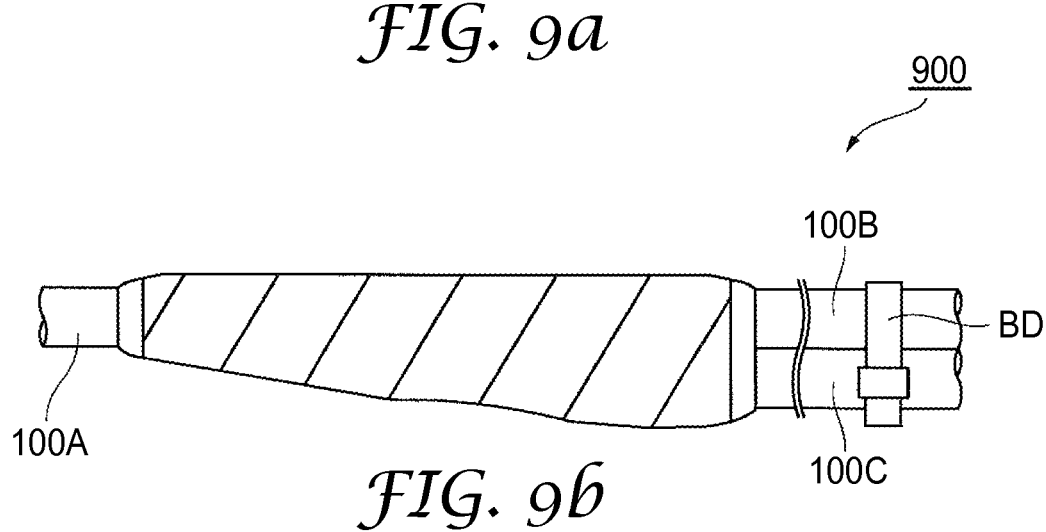

For example, in at least one embodiment of the invention when the insulating waterproof member is of the type in which the long belt-like extending portion 911 is wound to impart pressure on each of the regions, as in the protective sheet 903 according to the embodiment illustrated in FIGS. 9a-9b, the installation personnel are required to perform the winding while adjusting the winding position. In the first embodiment of FIG. 1, on the other hand, the protective sheet 3 includes the first extending portion 11A that extends from the first region 12A of the body portion 10, the second extending portion 11B that extends from the second region 12B of the body portion 10, and the third extending portion 11C that extends from the third region 12C of the body portion 10. Specifically, from the region where pressure is to be imparted, an extending portion capable of imparting the pressure is contiguously provided. As a result, the installation personnel can reliably impart pressure on the first region 12A by the first extending portion 11A, on the second region 12B by the second extending portion 11B, and on the third region 12C by the third extending portion 11C, without having to make any particular adjustments to the position of the winding. Thus, because the protective sheet 3 includes the extending portions 11A, 11B, and 11C at positions corresponding to the regions where pressure is to be applied, operability for installation personnel is improved.

Further, the V-forms are formed between the first extending portion 11A and the third extending portion 11C, and between the second extending portion 11B and the third extending portion 11C. For example, when a cut is provided between the extending portion 311A and the extending portion 311B as in the protective sheet 303 according to the comparative example illustrated in FIGS. 6b(1) to 6b(2), the pressure on the sealing material 2 and the body portion 10 at the cut position (position of outer edge 310d) is insufficient. On the other hand, when the V-forms are formed, there is no cut between the extending portions and pressure can be imparted over the entire sealing material 2 and body portion 10. Moreover, the extending portions 11A, 11B, and 11C can be formed by simply introducing the V-form cut-out portions CT1 and CT2 in the protective sheet.

Further, a portion of the sealing material 2 is joined to the body portion 10 of the protective sheet 3 and another portion of the sealing material 2 is not joined to the body portion 10. With this arrangement, installation personnel can easily move the portions of sealing material 2 that are not joined. Accordingly, the sealing material 2 can be easily embedded in portions between trunk cable 100B and the branch cable 100C (see FIG. 4b).

Moreover, the extending portions 11A, 11B, and 11C impart pressure on the sealing material 2 and the body portion 10 by being stretched and wound on the connector 101 with the sealing material 2 and the body portion 10 interposed therebetween. In this manner, the installation personnel can ensure reliable waterproofing properties by a simple operation of stretching the extending portions 11A, 11B, and 11C and winding the stretched extending portions around the connector 101.

Next, experiments to compare insulating waterproof members 200 and 300 according to comparative examples and an insulating waterproof member 400 according to a working example are described with reference to FIGS. 6a(1) to 6c(2). The insulating waterproof member 200 according to comparative example 1 is illustrated in FIGS. 6a(1) and 6a(2). The insulating waterproof member 200 according to comparative example 1 does not have extending portions and is formed by arranging a rectangular sealing material 2 on a rectangular protective sheet 203. The insulating waterproof member 200 was wound onto a Y-form branch connector 101, and an air-tightness test (internal pressure test at 49 kPa for 1 hour) was performed. The results of the air-tightness test are illustrated by indicating points at which an air leak was confirmed as AL in FIG. 6a(2). With this test, air leaks were confirmed at both end sides in the second direction D2 of the wound insulating waterproof member 200. In this manner, it can be seen that waterproofing is not obtained at both end sides.

The insulating waterproof member 300 of comparative example 2 is illustrated in FIGS. 6b(1) and 6b(2). The insulating waterproof member 300 of comparative example 2 includes the extending portions 311A and 311B at both end sides in the second direction D2, but does not have an extending portion formed in the region between the extending portions 311A and 311B, and a straight outer edge 310d of the body portion 10 is formed instead. The insulating waterproof member 300 was wound onto a Y-form branch connector 101, and an air-tightness test (internal pressure test at 49 kPa for 1 hour) was performed. The results of the air-tightness test are illustrated by indicating points at which an air leak was confirmed as AL in FIG. 6b(2). With this test, an air leak was confirmed at the outer edge 310d where the extending portion of the wound insulating waterproof member 300 is not provided. In this manner, it can be seen that waterproofing is not obtained at the central portion.

The insulating waterproof member 400 according to at least one embodiment of the present invention and referred to as working example 1 is illustrated in FIGS. 6c(1) and 6c(2). The insulating waterproof member 400 of working example 1 has extending portions 411A and 411B at both end sides in the second direction D2, and further includes two extending portions 411C and 411D formed between the extending portions 411A and 411B. In other words, the two extending portions 411C and 411D are formed at positions corresponding to the third region. The insulating waterproof member 400 was wound onto a Y-form branch connector 101, and an air-tightness test (internal pressure test at 49 kPa for 1 hour) was performed. As a result of the air-tightness test, when the insulating waterproof member according to working example 1 was used there were no air leaks in any position. Further, for the insulating waterproof member 1 according to an embodiment as in the working example 1 illustrated in FIG. 6c(2), no air leaks were confirmed in any position. In this manner, it can be seen that a sufficient degree of waterproofing could be obtained. It is to be noted that in the working example 1, four extending portions are formed and the installation personnel are therefore required to perform the winding of the extending portion four times. In the case of the insulating waterproof member 1 illustrated in FIG. 1, on the other hand, because three extending portions are formed, the installation personnel only need to perform the winding three times, and there is therefore an improvement in operability.

The present invention is not limited to the embodiment described above, and may take any of a variety of forms without departing from the scope of the present invention.

Figure 7A:
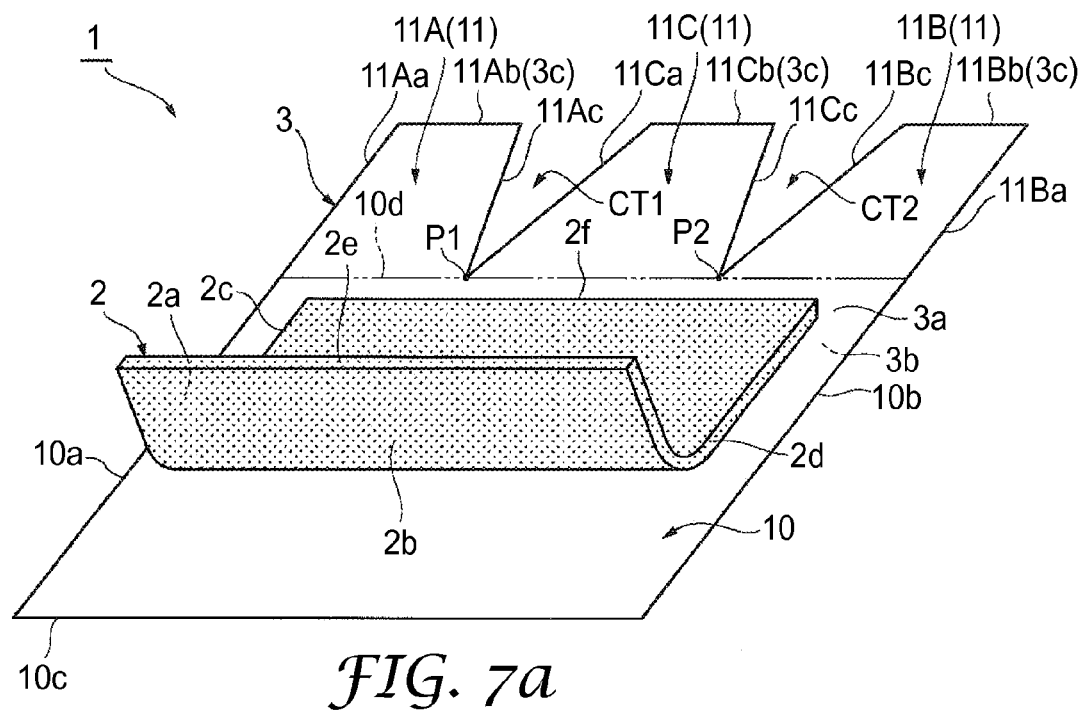
FIGS. 7a-7b is a view illustrating insulating waterproof members according to modified examples of embodiments of the present invention.
Figure 7B:
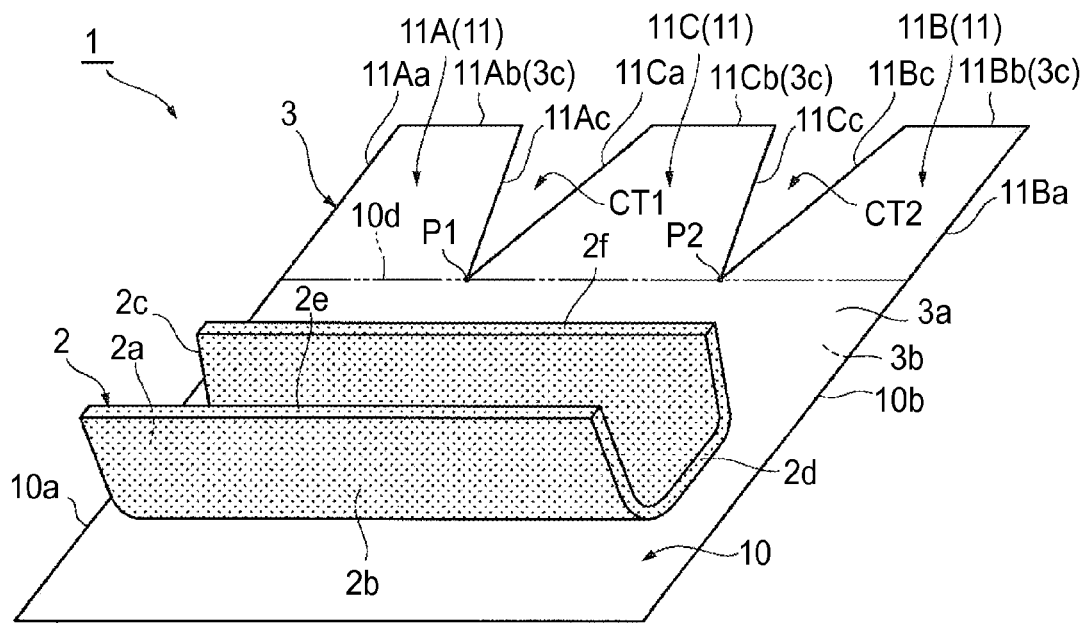

For example, in the embodiment described above, the sealing material 2 was not joined to the inner surface 3a of the body portion 10 at a region forming approximately half of the outer edge 2f. However, instead of this arrangement, the sealing material 2 may remain as not joined with the body portion 10 at a region of approximately half of the outer edge 2e, as illustrated in FIG. 7a. Alternatively, as illustrated in FIG. 7b, a configuration may be used in which a portion of the region on the outer edge 2f side and a portion of the region on the outer edge 2e are not joined to the body portion 10, and only a central portion is joined to the body portion 10. Further, in the examples illustrated in FIG. 1 to FIG. 7b, the portions not to be joined are configured by arranging release paper between the sealing material 2 and the body portion 10 at portions that are not to be joined. However, it should be noted that the portions not joined may instead be formed by arranging the sealing material 2 so as to be shifted with respect to the body portion 10 and causing a portion of the sealing material 2 to protrude outwards beyond the outer edge 10c of the body portion 10.

Figure 8A:
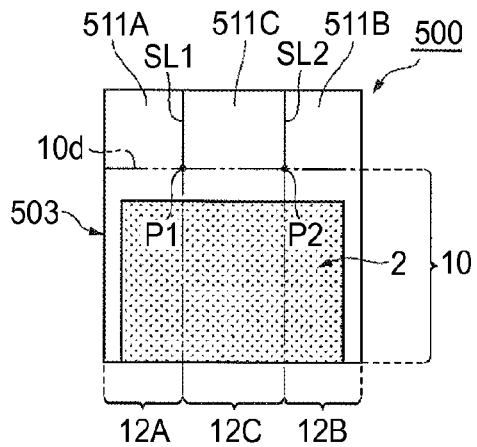
FIGS. 8a-8e is a view illustrating insulating waterproof members according to modified examples of embodiments of the present invention.
Figure 8B:
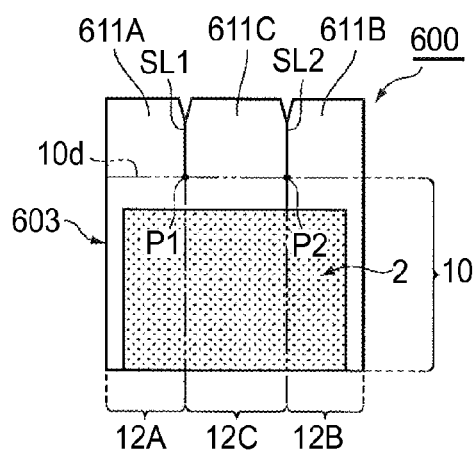

Further, the form of the extending portion is not limited to any particular form and may be varied to forms such as those illustrated in FIGS. 8a-8e. As illustrated in FIG. 8a, a protective sheet 503 of an insulating waterproof member 500 includes a first extending portion 511A, a second extending portion 511B, and a third extending portion 511C formed by introducing a cut-out SL1 extending straight from an outer edge to a point P1 and a cut-out SL2 extending straight from an outer edge to a point P2. Thus, the extending portions 511A, 511B, and 511C can be formed by the simple of operation of introducing the straight cut-outs SL1 and SL2. Further, as illustrated in FIG. 8b, a protective sheet 603 of an insulating waterproof member 600 includes, in addition to the cut-outs SL1 and SL2, V-form cut-out portions formed in an outer edge side portion of the cut-outs SL1 and SL2. With this arrangement, the installation personnel can easily stretch the extending portions 611A, 611B, and 611C.

Figure 8C:
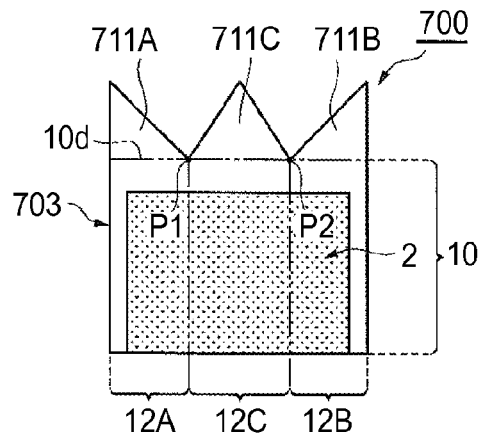
Figure 8D:
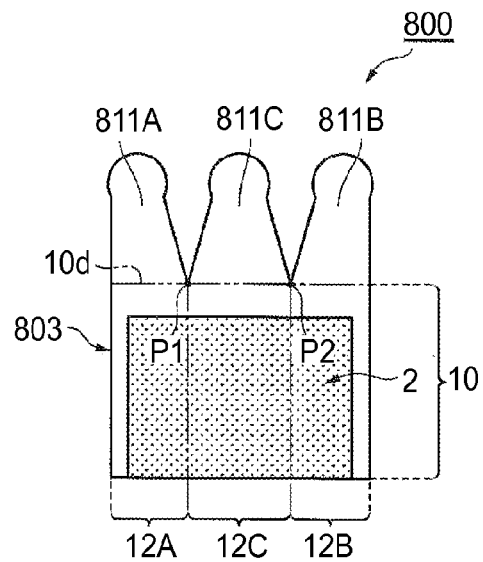

As illustrated in FIG. 8c, a protective sheet 703 of an insulating waterproof member 700 includes a first extending portion 711A, a second extending portion 711B, and a third extending portion 711C which are triangular. Further, as illustrated in FIG. 8d, a protective sheet 803 of an insulating waterproof member 800 includes a first extending portion 811A, a second extending portion 811B, and a third extending portion 811C with a rounded form added to allow triangular tips to be easily grasped in the fingers.

Figure 8E:
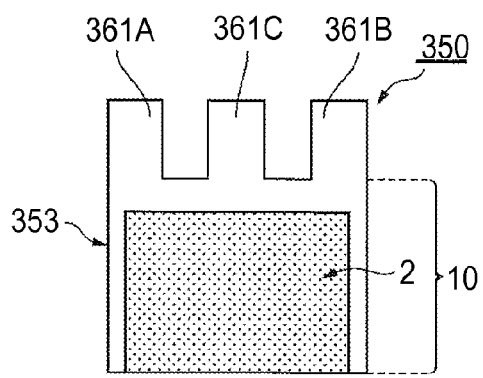

As illustrated in FIG. 8e, a protective sheet 353 of an insulating waterproof member 350 includes a first extending portion 361A, a second extending portion 361B, and a third extending portion 361C which are rectangular. Gaps are formed between the first extending portion 361A and the third extending portion 361C and between the second extending portion 361B and the third extending portion 361C. With such a form, pressure can still be imparted to the first region, the second region, and the third region. However, it should be noted that more reliable waterproofing can be ensured with the insulating waterproof members illustrated in FIG. 1 and FIGS. 8a to 8d, in which the extending portions are continuous and not cut part way along.

An insulating waterproof member 900 of the type illustrated in FIG. 9a may be used. The extending portion 911 of the protective sheet 903 of the insulating waterproof member 900 has a long belt-like form. As illustrated in FIG. 9b, the long belt-like extending portion 911 allows pressure to be applied to the first region, the second region, and the third region by being wound from the first end side to the second end side in the second direction D2.

REFERENCE NUMERALS 1, 350, 400, 500, 600, 700, 800, and 900 . . . Insulating waterproof member; 2 . . . Sealing material; 3, 353, 403, 503, 603, 703, 803, and 903 . . . Protective sheet; 10 . . . Body portion; 11, 361, 411, 511, 611, 711, 811, and 911 . . . Extending portion; 11A, 361A, 411A, 511A, 611A, 711A, and 811A . . . First extending portion; 11B, 361B, 411B, 511B, 611B, 711B, and 811B . . . Second extending portion; 11C, 361C, 411C, 411D, 511C, 611C, 711C, and 811C . . . third extending portion; 12A . . . First region; 12B . . . Second region; 12C . . . third region; 100 . . . cable; and 101 . . . connector.

What is claimed is:
1. An insulating waterproof member for insulating and waterproofing a connector of a cable, the insulating waterproof member comprising:

a sealing material for covering the connector; and a protective sheet for covering the connector with the sealing material interposed therebetween, the protective sheet having an adhesive layer on a surface on a sealing material side;

wherein the protective sheet comprises:

a body portion for covering the connector, and a plurality of extending portions formed from and that extend in a first direction from the body portion;

wherein, when the member is stretched and wound onto the connector with the sealing material and the body portion interposed therebetween, the plurality of extending portions impart pressure to the sealing material and the body portion that cover the connector in a first region at a first end side of the body portion in a second direction that intersects the first direction, in a second region at a second end side of the body portion, and in a third region between the first region and the second region; and wherein the plurality of extending portions comprises:

a first extending portion that extends from a first region of the body portion;

a second extending portion that extends from a second region of the body portion; and a third extending portion that extends from a third region of the body portion.

2. The insulating waterproof member according to claim 1, wherein a V-shape is formed between the first extending portion and the third extending portion, and between the second extending portion and the third extending portion.

3. An insulating waterproof member according to claim 1, and wherein the extending portion has a long belt-like form.

4. The insulating waterproof member according to claim 1, wherein a portion of the sealing material is joined to the body portion of the protective sheet and another portion of the sealing material is not joined to the body portion.

5. The insulating waterproof member according to claim 1, wherein the extending portion imparts pressure to the sealing material and the body portion by being stretched and wound onto the connector with the sealing material and the body portion interposed therebetween.

6. An insulating and waterproofing method for insulating and waterproofing the connector using the insulating waterproof member according to claim 1.

* * * * *

UNITED STATES PATENT AND TRADEMARK OFFICE
CERTIFICATE OF CORRECTION

| | | |
|---|---|---|
| PATENT NO. | : 9,502,879 B2 | Page 1 of 1 |
| APPLICATION NO. | : 14/381455 | |
| DATED | : November 22, 2016 | |
| INVENTOR(S) | : Kengo Takasu | |

It is certified that error appears in the above-identified patent and that said Letters Patent is hereby corrected as shown below:

On the Title Page

Column 1 Title, Delete "INSULATION WATERPROOF MEMBER AND INSULATION WATERPROOFING METHOD" and insert -- INSULATING AND WATERPROOFING MEMBER AND INSULATING AND WATERPROOFING METHOD --, therefor.

Column 1 Inventors Line 1, Delete "Yokoham" and insert -- Yokohama --, therefor.

In the Claims

Column 14
Line 9, In Claim 3, delete "An" and insert -- The --, therefor.

Signed and Sealed this
Twenty-third Day of May, 2017

Michelle K. Lee
*Director of the United States Patent and Trademark Office*